United States Patent [19]

Martel et al.

[11] 3,862,160

[45] Jan. 21, 1975

[54] DERIVATIVES OF 9H-PYRIDO(3,4-B) INDOLE AND PROCESS OF PREPARATION

[75] Inventors: Jacques Martel, Bondy; Jean Buendia, Nogent-sur-Marne; Germain Costerousse, Vernouillet, all of France

[73] Assignee: Roussel Uclaf, Paris, France

[22] Filed: July 24, 1973

[21] Appl. No.: 382,061

[30] Foreign Application Priority Data

July 31, 1972  France .............................. 72.27501

[52] U.S. Cl.. 260/295 C, 260/326.13 R, 260/345.8, 260/345.9
[51] Int. Cl............................................. C07d 27/54
[58] Field of Search ................................ 260/295 C

[56] References Cited
UNITED STATES PATENTS
3,029,247  4/1962  Schut.................................. 260/296

*Primary Examiner*—G. Thomas Todd
*Attorney, Agent, or Firm*—Bacon & Thomas

[57] ABSTRACT

The preparation of derivatives of 1,2,3,4-tetrahydro-9H-pyrido [3,4-b] indole is described. In particular the preparation of acrylic esters of β-(3'-hydroxypropyl)-1,2,3,4-tetrahydro-9H-pyrido [3,4-b] indole is shown to proceed from the oxidation of a 2-alkyloxy-3-hydroxytetrahydropyran to its 2-alkyloxy-3-oxotetrahydropyran derivative. The Wittig condensation is used to effect the reaction of this ketone with a phosphonoacetic ester giving rise to the carbalkoxy methylenic-substitution product, 2-alkyloxy-3-(1'-alkoxycarbonyl)methylidenetetrahydropyran. After acid hydrolysis of the 2-alkyloxy group, condensation is carried out with tryptamine resulting in the desired indole derivatives. Such compounds can be used in the facile preparation of alkaloids of the eburnamonie family.

6 Claims, No Drawings

DERIVATIVES OF 9H-PYRIDO(3,4-B) INDOLE AND PROCESS OF PREPARATION

This invention relates to derivatives of 9H-pyrido [3,4-b] indole and to a process for preparation of same.

An object of this invention is the provision of derivatives of 1,2,3,4-tetrahydro-9H-pyrido [3,4-b] indole of formula I:

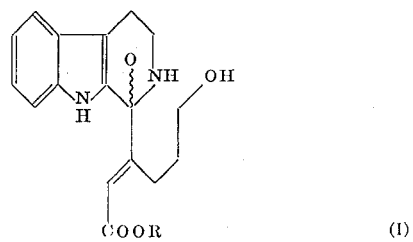

in which R represents an alkyl radical having from 1 to 4 carbon atoms and specifically ethyl β-(3'-hydroxypropyl)-1,2,3,4-tetrahydro-9H-pyrido [3,4-b] indole 1-acrylate.

Another object of this invention includes the process for preparation of these products and their application to the preparation of derivatives of indolo [2,3-a] quinolizine, which derivatives are used to obtain eburnamonine.

According to the invention, the preparation of the products of formula I is accomplished in accordance with the following reaction scheme:

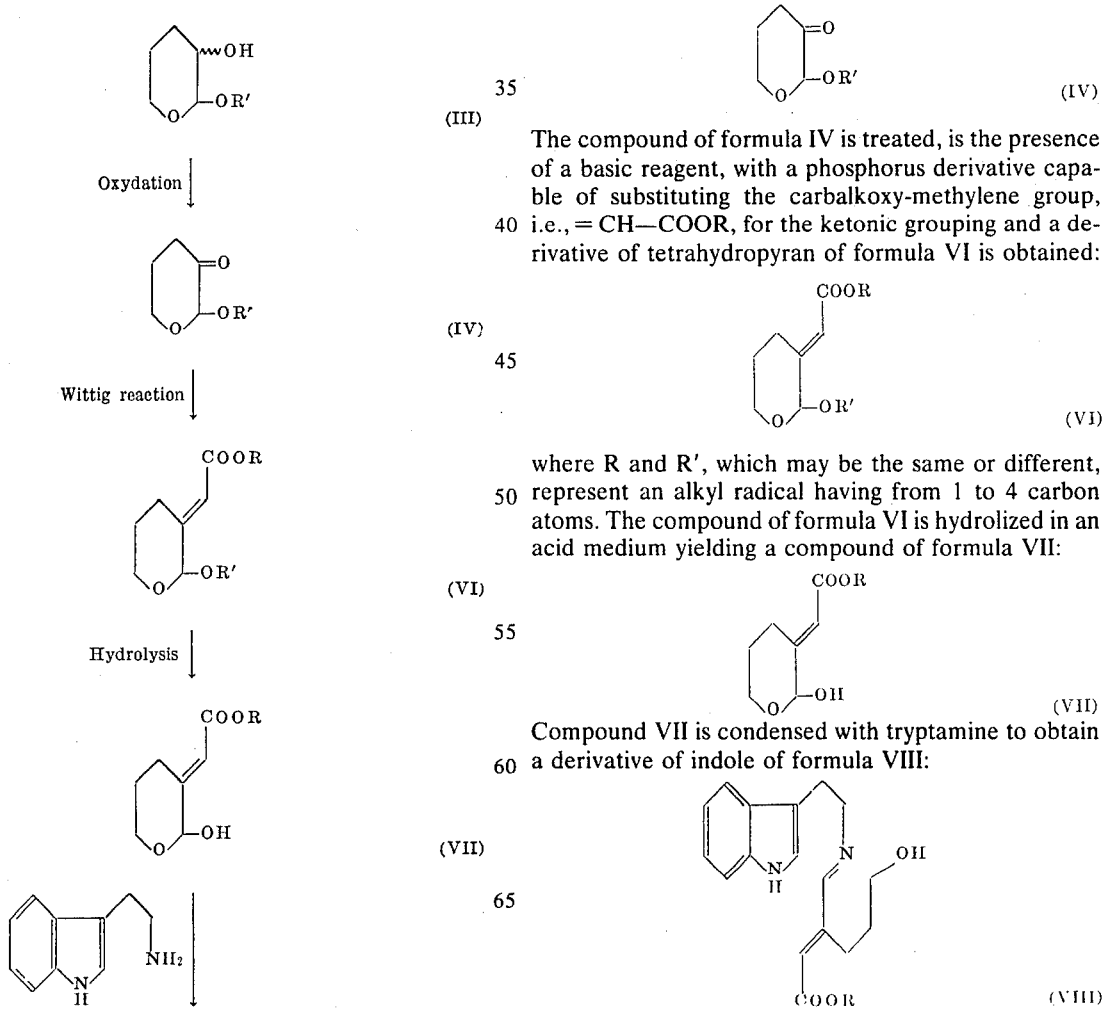

The process comprises the reaction of a 2-alkyloxy-3-hydroxy-tetrahydropyran of formula III

in which R' represents an alkyl radical having from 1 to 4 carbon atoms with an oxidizing agent to obtain a 2-alkyloxy-3-oxotetrahydropyran of formula IV:

The compound of formula IV is treated, is the presence of a basic reagent, with a phosphorus derivative capable of substituting the carbalkoxy-methylene group, i.e., =CH—COOR, for the ketonic grouping and a derivative of tetrahydropyran of formula VI is obtained:

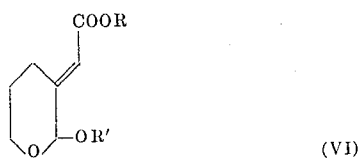

where R and R', which may be the same or different, represent an alkyl radical having from 1 to 4 carbon atoms. The compound of formula VI is hydrolized in an acid medium yielding a compound of formula VII:

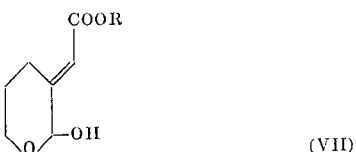

Compound VII is condensed with tryptamine to obtain a derivative of indole of formula VIII:

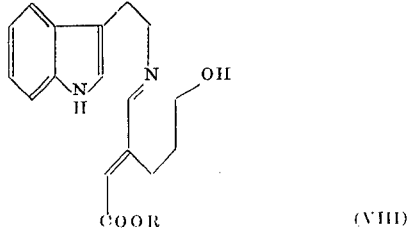

This occurs by the cyclization in an acid medium so as to form the derivative of 1,2,3,4-tetrahydro-9H-pyrido [3,4-b] indole of general formula I.

This process has been found particularly advantageous for obtaining the products of formula I in a limited number of steps. This arises as a result of the reactivity of compounds of formula VII with tryptamine, permitting the facile obtainment of the products of formula VIII. The latter compounds have a structure similar to that of the alkaloids of the eburanamonine family. The passage of products from formula I to eburnamonine is explained further on in the text.

In the process described above, different oxidizing agents can be used to transform the trans 2-alkyloxy-3-hydroxytetrahydropyran into 2-alkyloxy-3-oxotetrahydropyran. Preferably, the complex of chromic anhydride-pyridine is employed, but potassium permanganate, chromic anhydride or potassium bichromate can also be used.

The basic reagent in the presence of which the 2-alkyloxy-3-oxotetrahydropyran of formula IV is treated with the phosphorus derivative is preferably an alkaline amide, such as sodium amide. However, tertiary organic bases such as triethylamine, or alkaline alcoholates such as sodium methylate, or sodium terbutylate or sodium teramylate or even alkaline hydrides such as sodium hydride can also be used. The reaction which allows the compound of formula IV to be transformed into those of formula VI is known as the Wittig reaction. It is brought about with the aid of a phosphorus derivative in a basic medium. In this reaction a phosphonacetic ester of general formula V is used:

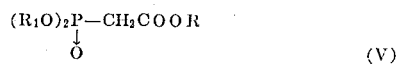
(V)

where $R_1$ and R, which may be the same or different, represent an alkyl radical having from 1 or 4 carbon atoms; other phosphorus derivatives can also be used, for example, those carbalkoxymethylenetriphenylphosphoranes of the general formula:

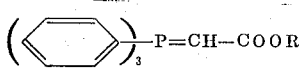

in which R represents an alkyl radical having from 1 to 4 carbon atoms.

The acid hydrolysis of the ether grouping of the compounds of formula VI, which allows their transformation into products of formula VII, can be brought about with the help of aqueous mineral acids such as dilute hydrochloric acid, dilute sulfuric acid or paratoluene sulfonic acid in dilute aqueous solution.

The cyclization of the indole derivatives of formula VIII into derivatives of 9H-pyrido [3,4-b] indole of formula I can be effected either with the aid of an aqueous mineral acid, such as dilute hydrochloric acid or dilute sulfuric acid or with the aid of an organic aqueous acid, such as dilute acetic acid or dilute trifluoracetic acid, in an organic solvent miscible with water, such as an alcohol selected from the group methanol, ethanol or isopropanol.

The invention also includes the application of products of formula I to the preparation of products of formula II:

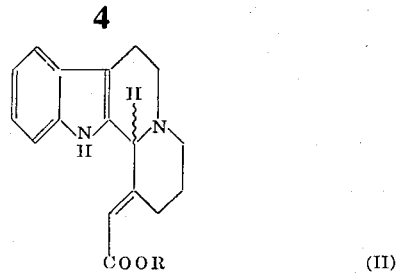
(II)

in which R is the same as in formula I. This is accomplished by the reaction of a cyclizing agent on the compounds of formula I to obtain the compounds of formula II. The preferred cyclization agent for obtaining the products of formula II is thionyl chloride, but numerous other agents can be used among which can be cited phosphorus trichloride or tribromide and phosphorus pentachloride or pentabromide.

The products of formula II are intermediary products useful for obtaining medicinal substances or products necessary for the preparation of such substances. Thus, eburnamonine can be obtained by the reaction of ethylmagnesium halide in the presence of cuprous chloride on compounds of formula II.

Belgian patent 776,337 has already described a preparation for eburnamonine beginning with an alkyl 5-halogenovalerate and tryptamine and having as an intermediate an alkyl 1,2,3,4,6,7,12,12b(E) octahydroinodolo [2,3-a] quinolizidene acetate of formula II. It is known that the alkaloids of the eburnamonine group are useful substances for human therapy due to their action on the circulation. (see for example Therapeutic Chemistry,) 1971, page 137).

It is therefore useful to be able to completely synthetise eburnamonine by preparative conditions of interest to industry. The preparative techniques already known for the synthesis of eburnamonine (see for example J. Amer. Chem. Soc., 1960, 82 5941 and 1964, 86, 2946) necessitate the separation for stereoisomeres and have limited yields. They also do not permit production of the product on a large scale without difficulties.

The preparative process for compounds of formula II described herein and consequent method for obtaining eburnamonine answer the preceeding demands from the point of view of facility of production as well as from the point of view of economic returns. Moreover the introduction of tryptamine in the last stage avoids the necessity of purification of compounds of high molecular weight in the first stage and thus facilitates the synthesis.

The process of the invention also provides new industrial products useful notably as intermediates for the preparation of products of formula I, namely the products of formula IV:

(IV)

in which R' represent an alkyl radical having from 1 to 4 carbon atoms.

The following examples illustrate the invention without in any way limiting it.

EXAMPLE I:

ethyl β-(3'-hydroxypropyl)-1,2,3,4-tetrahydro-9H-pyrido [3,4-b] indole-1-acrylate:

Stage A: 2-ethoxy-3-oxotetrahydropyran:

14.6 g. of trans-2-ethoxy-3-hydroxytetrahydropyran (prepared according to Bull. Soc. Chem., 1969, 621) are dissolved in a mixture of 500 cc of ether and 500 cc of benzene. 156 g of crystallized chromic anhydride-pyridine complex (prepared according to Poos and Coll., J. Amer. Chem. Soc., 75, 422, 1953), are added with agitation in fractions of 26 g over a 5 hour period.

On completion of this addition the resulting mixture is agitated for one more hour at room temperature. The solid residue is filtered and washed with ether. This etheral extract is combined with the filtrate and washed with a saturated sodium chloride solution.

After drying over sodium sulfate and evaporation in vacuum not exceeding 30°C., the residue is chromatographed on silica using a (9:1) mixture of benzene ethylacetate as eluent. Thus 10.3 g (72%) of 2-ethoxy-3-oxotetrahydropyran are obtained in the form of colorless oil.

I.R. Spectrum: C=O band at 1734 cm$^{116\ 1}$; presence of a C—O—C band.

NMR Spectrum: Peaks at 67.5–74.5 and 81.5 Hz (CH$_3$ of the ethoxy); broad peaks at 200–250 Hz (—CH$_2$—of the ethoxy) ; peak at 275 Hz (2H).

Stage B: 2-ethoxy-3-(1'-ethoxycarbonyl)methylidenetetrahydropyran:

1g of sodium hydride is introduced as a 50% dispersion in mineral oil into 50 cc of dimethoxyethane, recooled to 15°C and a solution of 4.48 g of triethylphosphonoacetate (prepared according to the Beilstein dictionary 4, II,976) in 10 cc of dimethoxyethane, is added in 30 minutes after this addition the mixture is agitated for 30 minutes and recooled to between 0°C and 5°C. A solution of 2.9 g of 2-ethoxy-3-oxotetrahydropyran, prepared in the preceeding stage, dissolved in 10 cc of dimethoxyethane, is added and the reaction mixture agitated for 30 minutes at 0°C. 20 cc of ice water are then added and the resulting mixure is poured into the water, extracted with methylene chloride and the extract washed again with water, dried and evaporated.

The residue is chromatographed on silica using a (9:1) mixture of benzene-ethylacetate as eluent. Thus 3,4 g (80%) of 2-ethoxy-3-(1'-ethoxycarbonyl)methylidenetetrahydropyran is obtained in the form of colorless oil.

I.R. Spectrum: C=O Band at 1713 cm$^{-1}$; C=C Band at 1,658 cm$^{-1}$, presence of a C-O-C Band.

NMR Spectrum: Peaks at 289 and 375Hz (2H); peaks at 338 and 345 Hz (ethylenic H). This NMR spectrum indicates that the product obtained is a mixture of E and Z isomers.

Stage C: 2-hydroxy-3-(1'-ethoxycarbonyl)methylidenetetrahydropyran:

2.52 g of 2-ethoxy-3-(1'-ethoxycarbonyl)methlidenetetradhycleopyran prepared in the preceeding stage is dissolved in a mixture containing 24 cc of dioxan, 2.4 cc of distilled water and 2.4 cc of 2N hydrochloric acid. It is agitated for 4 hours at room temperature. Sodium bicarbonate is added, then extracted with methylene chloride. After evaporating the solvent in vacuum, the residue is dried. It is then chromatographed on silica eluting with a (6:4) mixture of benzene-ethyl acetate. Thus 1.15 g (52%) of 2-hydroxy 3-(1'-ethoxycarbonyl)methylidenetetrahydropyran is obtained in the form of colorless oil.

I.R. Spectrum: C=O Band at 1,713 cm$^{-1}$; C=C band at 1,658 cm$^{-1}$; OH band at 3,585 cm$^{-1}$.

NMR Spectrum: Peaks at 313 and 393 Hz (2H); peaks at 340 and 351 Hz (ethylenic H). This NMR spectrum indicates that the product obtained is a mixture of E and Z isomers.

Stage D: Ethyl 3-(3'-hydroxypropyl-4-[β-(3''-indolyl)ethylimino]-2-butenoate:

560 mg of tryptamine are dissolved in 20 cc of benzene with agitation under a nitrogen atmosphere. 650 mg of 2-hydroxy-3-(1'-ethoxycarbonyl)-methylidenetetrahydropyran dissolved in 15 cm$^3$ of benzene are added. The solution is agitated for one hour at room temperature, then heated to reflux for 4 hours eliminating the water which has formed. The benzene is then removed by evaporation and 1.2 g of ethyl 3-(3'-hydroxypropyl)-4-[β-(3''-indolyl)ethylimino]- 2-butenoate is obtained in the form of colorless oil. This product is used as it is for the rest of the synthesis.

I.R. Spectrum: C=O Band at 1,712 cm$^{-1}$; NH Band at 3,476 cm$^{-1}$; presence of double bonds at 1,623 cm$^{-1}$.

U.V. Spectrum: (ethanol):
λ max. : 221nm ($\epsilon$=46650)
λmax. : 280nm ($\epsilon$=6850)
λmax : 290nm ($\epsilon$=5800)
Inflections at 240 and 272 nm.

Stage E: Ethyl β-(3'-hydroxypropyl)-1,2,3,4-tetrahydro-9H-pyrido-[3,4-b] indole 1-acrylate.

450 mg of ethyl 3-(3'-hydroxyproply) 4[β-(3''-indolyl) ethylimino]2-butenoate obtained in the preceeding stage is dissolved in 35 cc of ethanol. 1.8 cc of 6N hydrochloric acid are added dropwise and the solution agitated for 2 hours at room temperature. After pouring into water, the mixture is made alkaline with sodium hydroxide and extracted with methylene chloride. After washing with water and drying over sodium sulfate it is evaporated in vacuum to dryness. The residue is chromatographed on silica and eluted with a (5:3:2) mixture of chloroform-ethylacetate-ethanol. Thus 200 mg (40%) of ethyl β-(3'-hydroxypropyl)-1,2,3,4-tetrahydro-9H-pyrido [3,4-b] indole 1-acrylate are obtained in the form of a friable foam. The product recrystallized from ether has a melting point of 145°–150°C.

I.R. Spectrum: C=O Band at 1,710 cm$^{-1}$; C=C bands at 1,642 and 1,651 cm$^{-1}$; NH band at 3,452 cm$^{-1}$ U.V. Spectrum (ethanol):
λmax. : 224nm ($\epsilon$=3,8540)   λmax.: 277nm ($\epsilon$=7,020)
$\epsilon$max. : 282nm ($\epsilon$=7,120)
λmax. : 292nm ($\epsilon$=7,160)

EXAMPLE 2

Ethyl 1,2,3,4,6,7,12,12b-(E)-octahydroindolo [2,3-a]quinolizylidene acetate:

327 mg. of ethyl β-(3'-hydroxypropyl)-1,2,3,4-tetrahydro-9H-pyrido [3,4-b] indole-1-acrylate is suspended in 5 cc of benzene containing 0.2 cc of pyridine. 0.1 cc of thionyl chloride is added dropwise and the solution agitated for 1 hour at 20°C under a nitrogen atmosphere. The reaction solution is then poured into an aqueous solution of sodium bicarbonate and extracted with methylene chloride. After washing with water and drying over sodium sulfate, it is evaporated to dryness in vacuum. The residue is chromatographed on silica and eluted with a (5:3:2) mixture of chloroform -ethylacetate-ethanol. Thus 121 mg (40%) of ethyl 1,2,3,4,6,7,12,12b-(E)-octahydroindolo [2,3-a] quinolizylidine acetate are obtained in the form of a friable foam, which, after crystallization from ether, has a melting point of 158°-160°C.

I.R. Spectrum : C=O Band at 1,709 cm $^{-1}$; C=C Band at 1,650 cm $^{-1}$; NH Band at 3,458 cm$^{-1}$; deformation of C=C at 886 cm$^{-1}$.

NMR Spectrum: triplet at 68.5–76 and 83 Hz ($CH_3$—of—$CO_2$—$CH_2$—$CH_3$) ) quadruplet at 240-247-254- and 261.5 Hz (—$CH_2$—of—$CO_2$—$CH_2$—$CH_3$) peak at 267 Hz (H at the position 12 b); peak at 349 Hz (H of >=CH—$CO_2$—$CH_2CH_3$)

Preparation of (±) eburnamonine:

4.30 cc of ethylmagnesium bromide in 0.95 m/l tetrahydrofuran and 20 mg of cuprous chloride are mixed in a nitrogen atmosphere at 25°C. The mixture is agitated for 10 minutes and then recooled to −10°C. A solution of 412 mg of the product obtained according to example 2 in 4 cc of tetrahydrofuran are added over a 15 minutes. After standing at −10°C for 1 hour and at 0°C for 30 minutes the mixture is poured into an aqueous solution of ammonium chloride and agitated. Then, the mixture is extracted with methylene chloride and the methylene chloride extract is dried over magnesium sulfate and the solvent evaporated. The residue is chromatographed on silica and eluted with a (6:3:1) mixture of chloroform-ethylacetate-ethanol. 176 mg of product are obtained that is purified by recrystallization from ethanol. After drying, 152 mg of racemic eburnamonine are obtained, having a melting point of 204°C.

What is claimed is:

1. A derivative of 1,2,3,4-tetrahydro-9H-pyrido [3,4-b] indole of the formula;

(I)

in which R represents an alkyl radical having from 1 to 4 carbon atoms.

2. Ethyl β-(3'-hydroxypropyl)-1,2,3,4-tetrahydro-9H-pyrido [3,4-b] indole 1-acrylate.

3. A process for the preparation of a compound of the formula:

(I)

comprising reacting a tetrahydropyran of the formula:

(III)

in which R' represents an alkyl radical having from 1 to 4 carbon atoms with an oxidizing agent so as to obtain a 2-alkoxy-3-oxo-tetrahydropyran of the formula:

(IV)

in which R' is the same as defined above, treating the compound of formula IV in the presence of a basic reagent, with a phosphorus derivative capable of substituting a carbalkoxymethylene grouping for the ketonic grouping to provide a derivative of tetrahydropyran of the formula:

(VI)

where R and R', which may be the same or different, represent an alkyl radical having from 1 to 4 carbon atoms, hydrolyzing the compound of formula VI in an acid medium to form a product of the formula:

(VII)

condensing the compound of formula VII with tryptamine to obtain an indole derivative of the formula:

(VIII)

and cyclizing the compound of formula VIII in an acid medium to provide a derivative of 1,2,3,4-tetrahydro-9H-pyrido [3,4-b] indole of the formula I.

4. A process according to claim 3 in which the oxidizing agent which reacts with the 2-alkyloxy-3-hydroxy tetrahydropyran of formula III is a complex of chromic anhydride-pyridine.

5. A process according to claim 3 in which the basic reagent in whose presence the phosphorus derivative reacts on the 2-alkyloxy-3-oxotetrahydropyran of formula IV is sodium amide.

6. A process according to claim 3 in which the phosphorus derivative that reacts on the product of formula IV, is a phosphonoacetic ester of the formula:

$$(R_1O)_2P(O)-CH_2COOR \quad (V)$$

where $R_1$, and R, which may be the same or different, represent an alkyl radical having from 1 to 4 carbon atoms.

* * * * *